(12) United States Patent
Ibach et al.

(10) Patent No.: US 9,088,380 B2
(45) Date of Patent: Jul. 21, 2015

(54) OPTICAL TRANSPORT NETWORK GENERIC NON-CLIENT SPECIFIC PROTECTION SYSTEMS AND METHODS

(71) Applicant: CIENA CORPORATION, Hanover, MD (US)

(72) Inventors: Trevor John Ibach, Manotick (CA); Trevor Donald Corkum, Middle Cornwall (CA); Larry Babineau, Kanata (CA); Hassan Dayfallah, Ottawa (CA)

(73) Assignee: Ciena Corporation, Hanover, MD (US)

( * ) Notice: Subject to any disclaimer, the term of this patent is extended or adjusted under 35 U.S.C. 154(b) by 267 days.

(21) Appl. No.: 13/627,285

(22) Filed: Sep. 26, 2012

(65) Prior Publication Data

US 2013/0322867 A1 Dec. 5, 2013

Related U.S. Application Data

(60) Provisional application No. 61/653,638, filed on May 31, 2012.

(51) Int. Cl.
*H04J 3/16* (2006.01)
*H04Q 11/00* (2006.01)

(52) U.S. Cl.
CPC .......... *H04J 3/1652* (2013.01); *H04Q 11/0062* (2013.01); *H04J 2203/006* (2013.01); *H04Q 2011/0081* (2013.01); *H04Q 2213/1301* (2013.01)

(58) Field of Classification Search
CPC .......................... H04J 3/1652; H04J 2203/006
USPC ............................................................ 398/66
See application file for complete search history.

(56) References Cited

U.S. PATENT DOCUMENTS

| | | | |
|---|---|---|---|
| 7,143,161 B2 | 11/2006 | Brissette | |
| 7,257,117 B2 | 8/2007 | Roberts et al. | |
| 7,602,814 B2 | 10/2009 | Meagher et al. | |
| 7,792,044 B2 | 9/2010 | Holness et al. | |
| 7,969,868 B2 | 6/2011 | Liou et al. | |
| 2003/0123493 A1* | 7/2003 | Takahashi | 370/539 |
| 2004/0114924 A1 | 6/2004 | Holness et al. | |
| 2008/0089693 A1* | 4/2008 | El-Ahmadi et al. | 398/135 |
| 2008/0199183 A1* | 8/2008 | Liu et al. | 398/103 |
| 2008/0279553 A1 | 11/2008 | Meagher et al. | |
| 2009/0161681 A1 | 6/2009 | Madrahalli et al. | |
| 2009/0232492 A1 | 9/2009 | Blair et al. | |
| 2010/0014857 A1* | 1/2010 | Haas | 398/43 |
| 2010/0054731 A1 | 3/2010 | Oltman et al. | |
| 2010/0272438 A1 | 10/2010 | Conklin et al. | |
| 2011/0013911 A1 | 1/2011 | Alexander et al. | |
| 2011/0170859 A1 | 7/2011 | Conklin et al. | |
| 2011/0170860 A1 | 7/2011 | Smith et al. | |
| 2011/0262128 A1 | 10/2011 | Madrahalli et al. | |
| 2011/0274427 A1 | 11/2011 | Madrahalli et al. | |
| 2012/0269511 A1* | 10/2012 | Calderon et al. | 398/58 |
| 2013/0114953 A1* | 5/2013 | Moynihan et al. | 398/5 |

\* cited by examiner

*Primary Examiner* — Nathan Curs
(74) *Attorney, Agent, or Firm* — Clements Bernard PLLC; Christopher L. Bernard; Lawrence A. Baratta, Jr.

(57) ABSTRACT

Systems and methods for generic non-client specific 1+1 protection are described supporting a uni-directional protection scheme for client interfaces on Optical Transport Network (OTN) networking equipment, regardless of the client protocol and without hardware which can participate in those client protocols. This generic non-client specific 1+1 protection can be implemented in an OTN node, an OTN switching device, or via an OTN method. Faults on client signals are escalated to, and processed at, the ODU path layer instead of the client protocol layer, providing a normalized mechanism for client signal protection.

18 Claims, 7 Drawing Sheets

OPTICAL TRANSPORT NETWORK GENERIC NON-CLIENT SPECIFIC PROTECTION SYSTEMS AND METHODS

CROSS-REFERENCE TO RELATED APPLICATION(S)

The present non-provisional patent application/patent claims the benefit of priority of U.S. Provisional Patent Application No. 61/653,638, filed on May 31, 2012, and entitled "GENERIC NON-CLIENT SPECIFIC 1+1 PROTECTION," the contents of which are incorporated in full by reference herein.

FIELD OF THE INVENTION

Generally, the field of art of the present disclosure pertains to optical networking systems and methods, and more particularly, to Optical Transport Network (OTN) systems and methods supporting a unidirectional protection scheme for client interfaces on OTN networking equipment, regardless of the client protocol and without hardware which can participate in those client protocols.

BACKGROUND OF THE INVENTION

Conventionally, clients in OTN networks can be any of multiple protocols and signal rates. The subtending client equipment may be specific processing equipment (switches, routers, Synchronous Optical Network (SONET) or Synchronous Digital Hierarchy (SDH) network elements, etc.) or other transport networks. Additional resiliency of the OTN client equipment/subtending client equipment/network handoff can be provided with a protected signal from that subtending equipment. OTN is defined in, for example, ITU-T Recommendation G.709 (12/09) "Interfaces for the Optical Transport Network (OTN)", ITU-T Recommendation G.798 (10/10) "Characteristics of optical transport network hierarchy equipment functional blocks", etc. Disadvantageously, OTN equipment may not have the capability to interwork with client specific protection schemes since it may be only mapping the client signals into OTN payloads rather than participating in the client protocol. Any such ability to participate in a protection scheme may be limited to the OTN monitoring, termination and generation capability of the OTN equipment.

Conventional systems and methods rely on participation in the client protocols to provide client-specific protection schemes. The conventional systems and methods which participate in client specific protection protocols require that client interface equipment terminate incoming client protocols and participate in those protection protocols. An example would be 1+1 Automatic Protection Switching (APS) protection for redundant SONET clients, where it would need to understand the APS byte signaling for the protection protocol. If the client interface equipment is remotely located and is using a protection protocol, OTN networking equipment may need to terminate the OTN layer in order to participate in that protection protocol whereas normally it would just perform an Optical channel Data Unit (ODU) connection function. Alternatively, if the client interface equipment is using an OTN based protection protocol, then the OTN networking equipment would need to participate in that APS protection scheme at the ODU connection point. This may be more difficult if the OTN line rate to the remote equipment is higher than the ODU connection rate, therefore requiring multiplexing to occur at the OTN networking point.

Additionally, the client protection scheme would only be able to be closed on the local equipment where the client signals enter the OTN network. The redundant client interfaces need the ability to compare signal status and communicate protection protocol requests. So it is not possible to have the protection scheme enter the OTN network on diversely located equipment, nor can the equipment which closes protection be remotely located from any of the equipment with the client interfaces.

BRIEF SUMMARY OF THE INVENTION

In an exemplary embodiment, an Optical Transport Network (OTN) node includes redundant client interfaces including a first port and a second port; and a controller communicatively coupled to the first port and the second port, wherein the controller is configured to utilize maintenance signaling within the OTN protocol providing a generic mechanism to indicate client faults with associated devices connected to the first port and the second port, wherein the generic mechanism includes a uni-directional protection scheme for the redundant client interfaces in the OTN protocol which is independent of any client protocol associated with the redundant client interfaces. The maintenance signaling can be at an Optical channel Data Unit (ODU) path layer, and the maintenance signaling can include one of a generic Alarm Indication Signal (AIS) in an Optical channel Payload Unit (OPU) payload and assertion of an OPU Client Signal Fail (CSF) each of which is transparent to ODU layer processing. The associated devices are provisioned to propagate faults to the first port and the second port via ODU AIS which is monitored for by the controller. The OTN node can further include a Y-cable splitter/coupler connecting each of the first port and the second port to a client device. The OTN node can further include a first Optical Channel (OCh) function on the first port communicatively coupled to a client device, and a second Optical Channel (OCh) function on the second port communicatively coupled to the client device.

Optionally, the first OCh function and the second OCh function each interface to the client device with non-OTN signals, and the OTN node can further include a first Optical channel Data Unit (ODUk) function communicatively coupled to the first OCh function; a second ODUk function communicatively coupled to the second OCh function, wherein each of the first ODUk function and the second ODUk function is configured to adapt the non-OTN signals into an OTN signal and to utilize the maintenance signaling to indicate client faults; and an ODU connection function communicatively coupled to each of the first ODUk function and the second ODUk function and configured to select one of the redundant client interfaces based on the maintenance signaling. Alternatively, the first OCh function interfaces with an OTN signal and the second OCh function interfaces with a non-OTN signal, and the OTN node can further include a first Optical channel Transport Unit (OTUk) function communicatively coupled to the first OCh function and an ODUk monitor point communicatively coupled to the OTUk function and configured to monitor for the maintenance signaling in the OTN signal; a second ODUk function communicatively coupled to the second OCh function, wherein the second ODUk function is configured to adapt the non-OTN signal into an OTN signal and to utilize the maintenance signaling to indicate client faults; and an ODU connection function communicatively coupled to each of the ODUk monitor point and the second ODUk function and configured to select one of the redundant client interfaces based on the maintenance signaling.

The first OCh function can be communicatively coupled to an OTN transponder network element prior to the client device, and wherein the OTN transponder network element can include a first ODUk function configured to adapt a non-OTN signal into the OTN signal and to utilize the maintenance signaling to indicate client faults. The first OCh function can be communicatively coupled to a first OTN transponder network element prior to the client device, and wherein the first OTN transponder network element can include a first ODUk function configured to adapt a non-OTN signal into the OTN signal and to utilize the maintenance signaling to indicate client faults; wherein the second OCh function can be communicatively coupled to a second OTN transponder network element prior to the client device, and wherein the second OTN transponder network element can include a second ODUk function configured to adapt a non-OTN signal into the OTN signal and to utilize the maintenance signaling to indicate client faults. The OTN node can further include a first Optical channel Transport Unit (OTUk) function communicatively coupled to the first OCh function and a first ODUk monitor point communicatively coupled to the first OTUk function and configured to monitor for the maintenance signaling in the OTN signal; a second Optical channel Transport Unit (OTUk) function communicatively coupled to the second OCh function and a second ODUk monitor point communicatively coupled to the second OTUk function and configured to monitor for the maintenance signaling in the OTN signal; and an ODU connection function communicatively coupled to each of the first ODUk monitor point and the second ODUk monitor point and configured to select one of the redundant client interfaces based on the maintenance signaling.

The first OCh function and the second OCh function can each interface to a Y-cable splitter/coupler, wherein the Y-cable splitter/coupler can be configured to split a single interface from the client device to become the redundant client interfaces and to select one output from the OTN node to the client device. The OTN node can include OTN multiplexing on at least one of outputs of the first OCh function and the second OCh function. The maintenance signaling can be transparent to Optical channel Data Unit (ODU) processing.

In another exemplary embodiment, an Optical Transport Network (OTN) switching device includes switching circuitry receiving a first Optical channel Data Unit k (ODUk) and a second ODUk, wherein the first ODUk and the second ODUk each include redundant client interfaces to one another, and wherein the circuitry is configured to select one of the first ODUk and the second ODUk based upon maintenance signaling providing a generic mechanism to indicate client faults associated with the redundant client interfaces; and Optical channel Transport Unit k (OTUk) circuitry adapting an output from the switching circuitry into an OTUk, wherein the generic mechanism includes a uni-directional protection scheme for the redundant client interfaces in OTN which is independent of any client protocol associated with the redundant client interfaces. The maintenance signaling can be at an Optical channel Data Unit (ODU) path layer. The maintenance signaling can include one of a generic Alarm Indication Signal (AIS) in an Optical channel Payload Unit (OPU) payload and assertion of an OPU Client Signal Fail (CSF) each of which is transparent to ODU layer processing. The OTN switching device can further include first ODUk circuitry providing the first ODUk to the switching circuitry; and second ODUk circuitry providing the second ODUk to the switching circuitry; wherein each of the first ODUk circuitry and the second ODUk circuitry is configured to adapt non-OTN signals into an OTN signal and to utilize the maintenance signaling to indicate client faults detected therein. The OTN switching device can further include ODUk multiplexing circuitry subsequent to the first ODUk circuitry, wherein the ODUk multiplexing circuitry is configured to provide the first ODUk to the switching circuitry.

In yet another exemplary embodiment, an Optical Transport Network (OTN) method includes receiving redundant client interfaces from a client device; detecting a fault on one of the redundant client interfaces; processing the fault at the OTN path layer via a generic protection mechanism instead of at a client protocol layer via utilizing maintenance signaling; and providing switching at an Optical channel Data Unit k (ODUk) layer based on the maintenance signaling; wherein the generic protection mechanism includes a uni-directional protection scheme for the redundant client interfaces in OTN which is independent of any client protocol associated with the redundant client interfaces.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

In various exemplary embodiments, systems and methods for generic non-client specific protection are described supporting a unidirectional protection scheme for client interfaces on OTN networking equipment, regardless of the client protocol and without hardware which can participate in those client protocols. This generic non-client specific protection can be implemented in an OTN node, OTN switching circuitry, or via an OTN method. Faults on client signals are escalated to, and processed at, the OTN path layer instead of the client protocol layer, providing a normalized mechanism for client signal protection. The systems and methods allow for a subtending network element to perform the mapping of a client into OTN at a remote site, and the protection scheme can close at the local OTN switching equipment purely based on the ODU path layer status. This allows for redundant links to remote sites as well as redundant remote sites.

Generic non-client specific protection provides various benefits for OTN networking equipment, OTN networks, system operators, and the like. For example, the systems and methods allow a simple, consistent protection mechanism for any or all client signals in OTN networking equipment. Redundant client signals can enter the OTN network at physically diverse locations, providing added redundancy to the network. The protection mechanism can be closed at OTN networking equipment which may be remotely located to one or both client access points, which would not need to participate in client protocols. The client access points may provide redundant links to the OTN network equipment, such as a Y-cable mechanism to provide redundancy for client mapping equipment in addition to the link to the OTN networking equipment. This allows the remote protection scheme to interoperate with a subnetwork connection protection (SNCP) mechanism on the OTN networking equipment, regardless of the OTN line rate between equipment.

Figure 1:
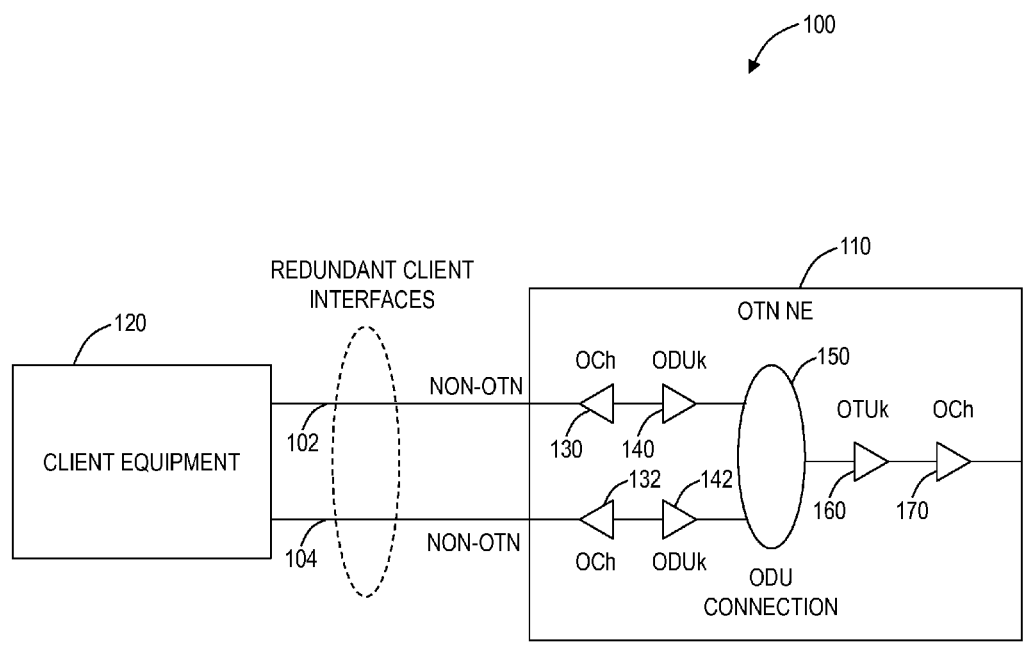
FIG. 1 is a block diagram of non-OTN client 1+1 protection client interfaces on a same network element as ODU protection.

Referring to FIG. 1, in an exemplary embodiment, a block diagram illustrates a first configuration 100 with non-OTN client 1+1 protection client interfaces 102, 104 on a same network element 110 as ODU protection. The client interfaces 102, 104 communicatively couple client equipment 120 with the OTN network element 110. The client equipment 120 can include, for example, SONET, SDH, Ethernet, Internet Protocol (IP), and the like. The client interfaces 102, 104 have a protection scheme associated with them that can include, for example, 1+1, 1:1, 1:N, SNCP, unidirectional path switched ring (UPSR), bidirectional line switched ring (BLSR), multiplex section protection (MSP), Multiplex Section Shared Protection Rings (MS-SPRing), tail end switching, Ethernet Ring Protection Switching (G.8032), and the like. The OTN network element 110 can include an optical switch, an optical and/or digital cross connect, a multi-service provisioning platform (MSPP), a dense wave division multiplexing (DWDM) platform, an OTN switch, etc. The client equipment 120 interfaces with the OTN network element 110 for transmission of a client signal redundantly protected by the client interfaces 102, 104. As such, the client signal is transparently provided using encapsulation associated with OTN and optionally is multiplexed into larger OTN signals.

The client interfaces 102, 104 in FIG. 1 are non-OTN interfaces and each is communicatively coupled to the OTN network element 110. The client equipment 120 is configured to perform some type of protection function with the redundant client interfaces 102, 104, i.e. 1+1, 1:1, tail end switch, path switch, etc. As described herein, the systems and methods associated with generic non-client specific protection are implemented through the OTN network element 110. The OTN network element 110 can be referred to as an OTN node, an OTN switch, etc. and can physically be a network element, circuitry within a network device, etc. The OTN network element 110 includes an optical channel (OCh) termination function 130, 132 for each of the client interfaces 102, 104. The OCh functions 130, 132 start and end, i.e. generate and terminate, an optical channel layer trail. Note, the client interfaces 102, 104 and all connections shown herein are bidirectional (transmit and receive) but illustrated as a single connection.

The OCh functions 130, 132 connect to Optical channel Data Unit k (ODUk) adaptation functions 140, 142 which generate/terminate an ODUk signal from the client interfaces 102, 104. In addition to performing standard adaptation functions, the adaptation functions 140, 142 are configured to utilize maintenance signaling within the OTN protocol to provide a generic mechanism to indicate client faults for both the client equipment 120 via the client interfaces 102, 104 and an ODU connection function 150. The maintenance signaling can be at an ODU path layer and can include a generic AIS in an Optical channel Payload Unit (OPU) payload or assertion of an OPU Client Signal Fail (CSF) each of which is transparent to ODU layer processing. The generic non-client specific protection uses optional maintenance signaling at the ODU path layer within the OTN protocol to provide a generic mechanism for indicating client faults.

By default, the OTN network element 110 can follow ITU Telecommunication Standardization Sector (ITU-T) standards and upon client signal failure insert a replacement signal, such as generic Alarm Indication Signal (AIS), into the Optical channel Path Unit (OPU) payload and/or assert the OPU Client Signal Fail (C SF) indicator, both of which are transparent to ODU layer processing equipment. Specifically, the user can provision the client interfaces so that incoming faults, as well as faults with the client equipment itself, can be propagated as an ODU maintenance signal, such as ODU AIS, into the OTN equipment at the ODUk termination points at the adaptation functions 140, 142, which can be monitored at ODU layer processing equipment in the ODU connection function 150.

At the OTN switch in the ODU connection function 150, or at any point where client signal comparison and selection can be performed, the incoming ODU path status can be compared between redundant paths, and the better quality path can be selected from the protection scheme. That is, the ODU connection function 150 can be configured to select one of the adaptation functions 140, 142. This could be a form of Sub-network Connection with Non-intrusive Monitoring (SNC/N) protection. Thus, directionally from the client equipment 120, the ODU connection function 150 selects one of the outputs from the adaptation functions 140, 142 for input to an Optical channel Transport Unit k (OTUk) adaptation function 160 which outputs to an OCh function 170 as an optical output from the OTN network element 110.

Directionally from the OCh function 170 to the ODU connection function 150, egress client traffic is bridged to both client interfaces 102, 104 by the ODU connection function 150. Because the protection scheme is unidirectional, no client specific protection signaling protocol is required of the client equipment 120 for the client interface 102, 104. Because the client traffic selection is based on ODU path status at the OTN layer, the ODU path may traverse multiple OTN network elements 110 before the point where client traffic is compared and selected. Any faults within those OTN network spans will also be apparent as ODU path layer faults at the point of the ODU connection protection. The functions 130, 132, 140, 142, 150, 160, 170 can be implemented in hardware including electrical and/or optical components, software, firmware, and combinations thereof.

Figure 2:
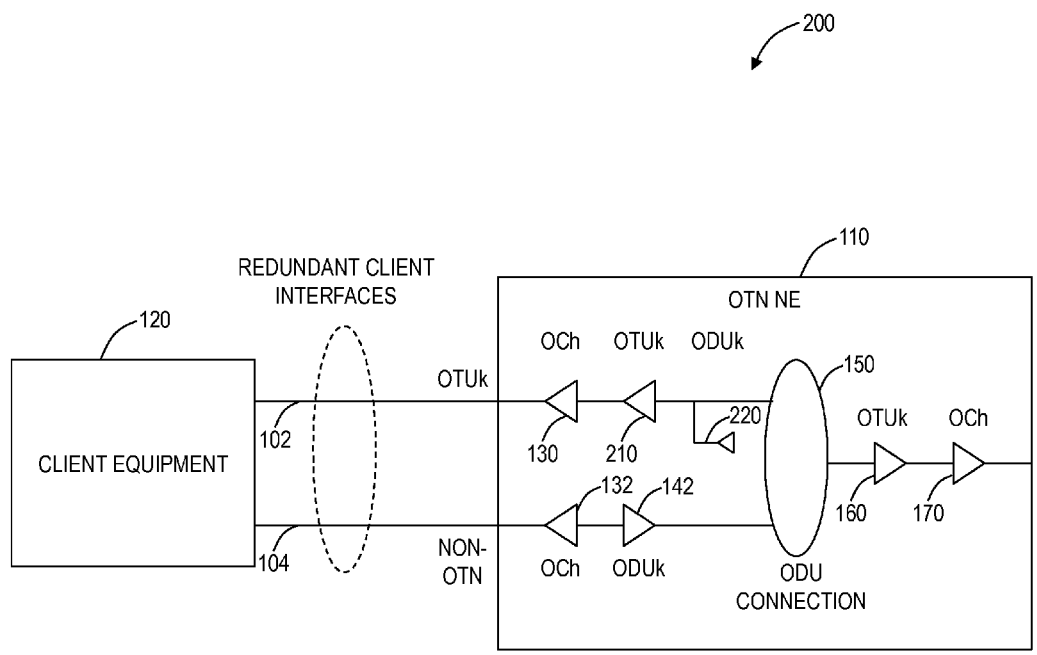
FIG. 2 is a block diagram of non-OTN and OTN (mixed) client 1+1 protection client interfaces on a same network element as ODU protection.

Referring to FIG. 2, in an exemplary embodiment, a block diagram illustrates a second configuration 200 with non-OTN and OTN (mixed) client 1+1 protection client interfaces on a same network element as ODU protection. The second configuration 200 is similar to the first configuration 100 with the functions 130, 132, 142, 150, 160, 170, but includes an OTN client for the client interface 102. That is, the client interface 102 is an OTUk and the client interface 104 is a non-OTN signal, but the client interfaces 102, 104 are still redundant client interfaces into the client equipment 120. With respect to the client interface 102 in the OTN network element 110, there is an OTUk adaptation function 210 and an ODUk monitor point 220. The ODUk monitor point 220 is configured to look for defects in the OTN signal such as, for example, AIS, Open Channel Indicator (OCI), Locked (LCK), etc. Because the client faults are propagated as ODU path maintenance signals, this can include Tandem Connection Monitoring (TCM) status, so the client signal selection could also be based on TCM status for the ODU path. This allows an OTN client and a non-OTN client to be redundant client interfaces, so long as the OTN client does contain the non-OTN client as payload.

Figure 3:
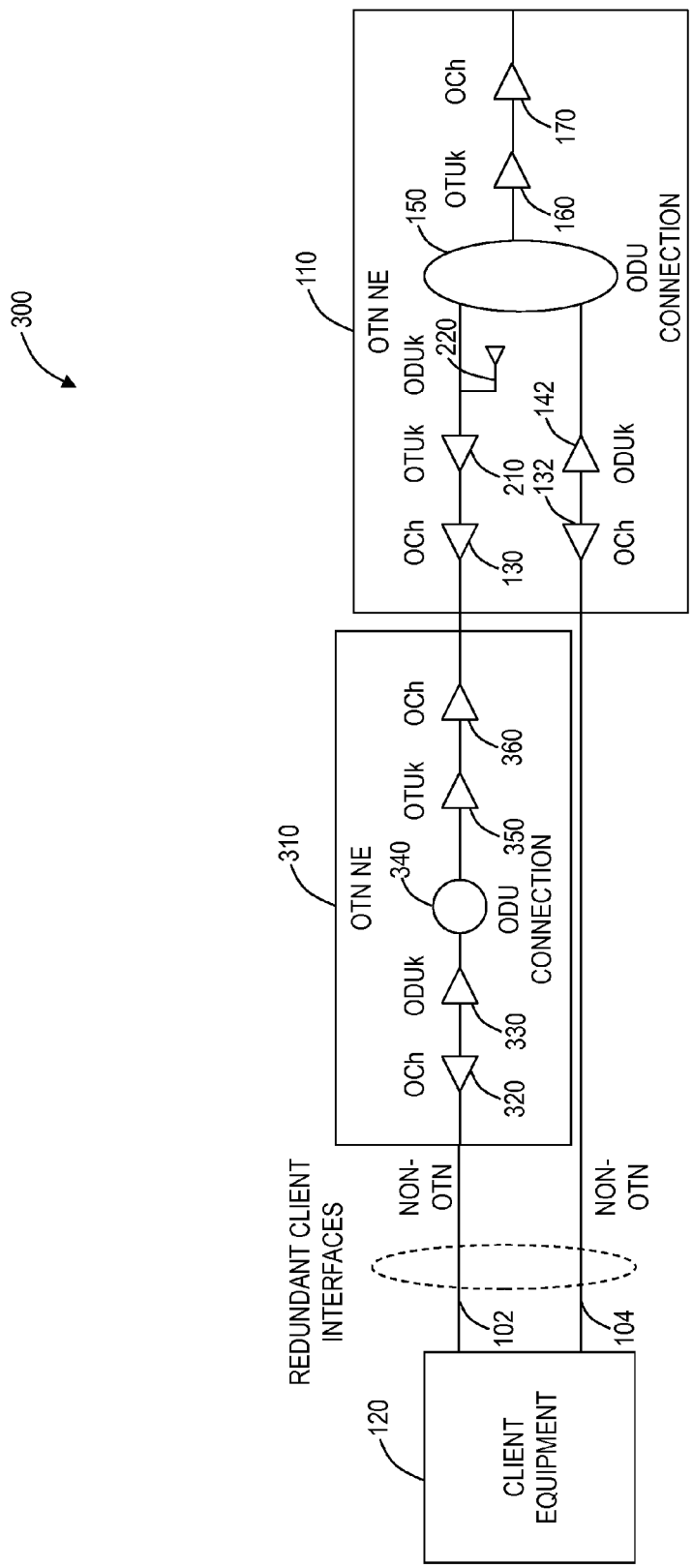
FIG. 3 is a block diagram of non-OTN client 1+1 protection with one client interface on a same network element as ODU protection.

Referring to FIG. 3, in an exemplary embodiment, a block diagram illustrates a third configuration 300 with non-OTN client 1+1 protection with one client interface on a same network element as ODU protection. The configuration 300 includes the same functions 130, 132, 142, 150, 160, 170, 210 and monitor point 220 as the configurations 100, 200 but includes non-OTN clients for the client interfaces 102, 104 and an OTN network element 310 providing the client interface 102 into an OTN interface for the OTN network element 110. That is, the configuration 300 is similar to the configuration 200 of FIG. 2 with the addition of the OTN network element 310 between the client interface 102 and the OTN network element 110. The OTN network element 310 can be part of the OTN network element 110 or separate. For example, the OTN network element 310 can include an optical transponder interfacing to the client equipment 120 to present a non-OTN signal to the client interface 102 and an OTN signal to the OCh function 130 on the OTN network element 110. In an exemplary embodiment, the OTN network element 110 is a switching network element, such as an optical switch, and the OTN network element 310 is a transponder network element, such as a DWDM network element.

The generic non-client specific protection can be utilized for protection schemes which are closed on the same equipment as the client facility (e.g., if the OTN network elements 110, 310 are combined), or for protection schemes which are closed on OTN equipment which is remotely located from the client facility (e.g., if the OTN network elements 110, 310 are separate). This latter mechanism also allows protected client signals to be physically diverse, entering this network on physically different devices or network elements (as exhibited by the client interface 102 in FIG. 3 and both the client interfaces 102, 104 in FIG. 4 if the OTN network elements 110, 310 are separate).

The OTN network element 310 includes an OCh function 320 that starts and ends an optical channel layer trail with the client interface 102. The OTN network element also includes an ODUk adaptation function 330 between the OCh function 320 and an ODU connection function 340. The ODUk adaptation function 330 operates similar to the adaptation functions 140, 142. Specifically, the adaptation function 330 generates/terminates an ODUk signal from the client interface 102. In addition to performing standard adaptation functions, the adaptation function 330 is configured to utilize maintenance signaling within the OTN protocol to provide a generic mechanism to indicate client faults for the client interface 102. The maintenance signaling can be at an ODU path layer and can include a generic AIS in an Optical channel Payload Unit (OPU) payload or assertion of an OPU Client Signal Fail (CSF) each of which is transparent to ODU layer processing. The generic non-client specific protection uses optional maintenance signaling at the ODU path layer within the OTN protocol to provide a generic mechanism for indicating client faults.

Note, the ODU connection function 340 solely receives and output from the ODUk 330 thus performs no selection. The selection is performed at the ODU connection function 150 in the OTN network element 110. The ODU connection function 340 interfaces with an OTUk function 350 which outputs to an OCh function 360 which provides an optical output from the OTN network element 310. The output of the OCh function 360 ultimately connects to the OCh function 130 in the OTN network element 110, and there can be various devices, components, network elements, etc. therebetween (not shown).

Figure 4:
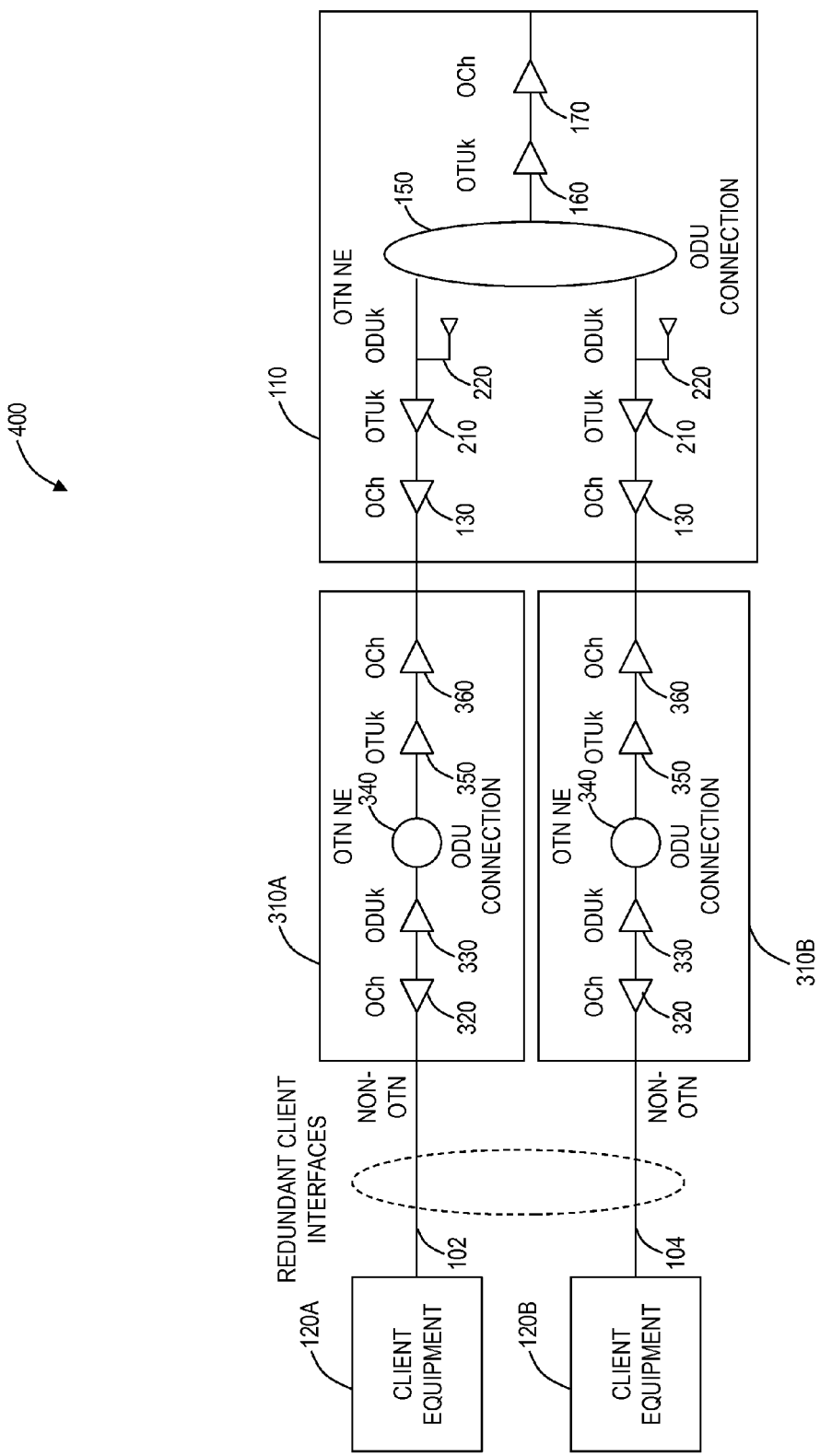
FIG. 4 is a block diagram of physically diverse client equipment client interfaces on different network elements than ODU protection.

Referring to FIG. 4, in an exemplary embodiment, a block diagram illustrates a fourth configuration 400 with physically diverse client equipment client interfaces on different network elements than ODU protection. The configuration 400 includes the same functions 130, 132, 142, 150, 160, 170, 210, 320, 330, 340, 350, 360 and monitor point 220 as the configurations 100, 200, 300 but includes non-OTN clients for the client interfaces 102, 104 and OTN network elements 310A, 310B providing the client interfaces 102, 104 into an OTN interface for the OTN network element 110. That is, the configuration 400 is similar to the configuration 300 of FIG. 3 with the addition of the OTN network element 310B between the client interface 104 and the OTN network element 110. In an exemplary embodiment, the OTN network element 110 is a switching network element, such as an optical switch, and the OTN network elements 310A, 310B are transponder network element, such as DWDM network elements.

In particular in FIG. 4, the client interfaces 102, 104 originate/terminate on the client equipment 120A, 120B. The client interface 102 is a non-OTN signal and is encapsulated as an OTN signal via the OTN network element 310A, and the client interface 104 is a non-OTN signal and is encapsulated as an OTN signal via the OTN network element 310B. Outputs of the OTN network elements 310A, 310B connect to the OCh function 130 in the OTN network element 110. The adaptation function 330 is configured to utilize maintenance signaling within the OTN protocol to provide a generic mechanism to indicate client faults for both the client interfaces 102, 104. Similar to FIG. 3, the OTN network element 110 in FIG. 4 includes the OTUk adaptation functions 210 and the ODUk monitor point 220. The ODUk monitor point 220 is configured to look for defects in the OTN signal such as, for example, AIS, Open Channel Indicator (OCI), Locked (LCK), etc. These defects may be inserted at the OTN network elements 310A, 310B.

Figure 5:
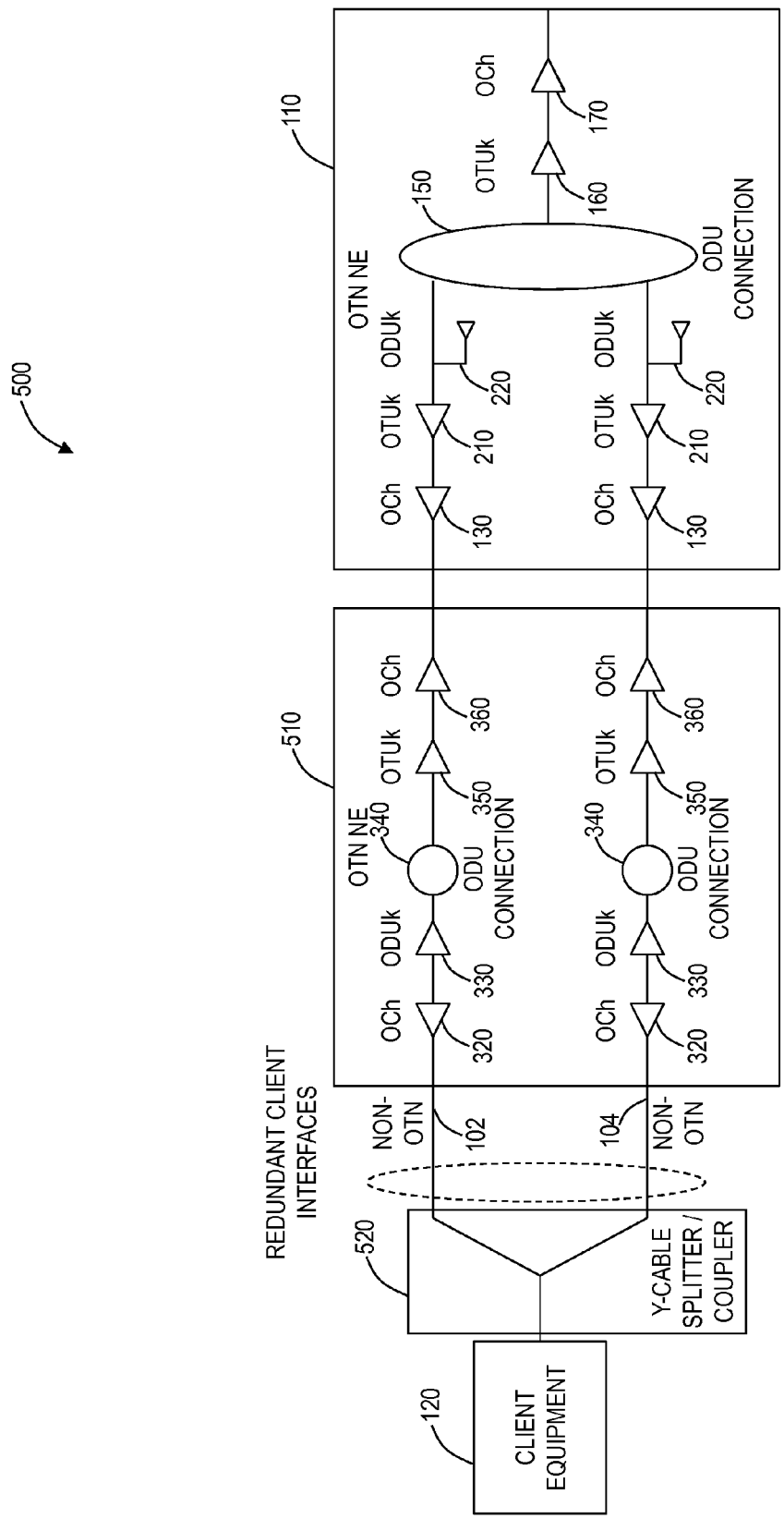
FIG. 5 is a block diagram of Y-Cable protection on remote network element client interfaces carried on equivalent Optical channel Transport Unit k (OTUk) lines to an OTN switching network element.

Referring to FIG. 5, in an exemplary embodiment, a block diagram illustrates a fifth configuration 500 with Y-Cable protection on remote network element client interfaces 102, 104 carried on equivalent Optical channel Transport Unit k (OTUk) lines to an OTN switching network element 110. The configuration 500 includes the same functions 130, 132, 142, 150, 160, 170, 210, 320, 330, 340, 350, 360 and monitor point 220 as the configurations 100, 200, 300, 400. The configuration includes non-OTN clients for the client interfaces 102, 104 and a single OTN network element 510 providing the client interfaces 102, 104 into an OTN interface for the OTN network element 110. In an exemplary embodiment, the OTN network element 110 is a switching network element, such as an optical switch, and the OTN network element 510 is a transponder network element, such as a DWDM network element.

In the example of FIG. 5, the client equipment 120 has a single interface which is provided to a Y-cable device 520. The Y-cable device 520 is configured to split an output of the client equipment 520 into the client interfaces 102, 104 and to couple the client interfaces 102, 104 into a single input to the client equipment 520. That is, the Y-cable device 520 is configured as a splitter directionally from the client equipment 120 to the OTN network element 510 and as a switch that selects one of the outputs from the OTN network element 510 for the client equipment 120. Y-cable protection is also referred to as transponder protection tray (TPT) by Ciena Corporation. Y-cable protection provides redundancy for client interface equipment as well as the line between the remote equipment and the OTN networking equipment. That is, the Y-cable device 520 protects against facility failures and failures in the OTN network element 510, but the Y-cable device 520 does not protect against failures in the client equipment 120.

In particular in FIG. 5, a single interface originates/terminates on the client equipment 120 and the single interface becomes the client interfaces 102, 104 via the Y-cable device 520. The client interface 102 is a non-OTN signal and is encapsulated as an OTN signal via the OTN network element 510, and the client interface 104 is a non-OTN signal and is encapsulated as an OTN signal via the OTN network element 510. The adaptation function 330 is configured to utilize maintenance signaling within the OTN protocol to provide a generic mechanism to indicate client faults for both the client interfaces 102, 104. Outputs of the OTN network element 510 connect to the OCh function 130 in the OTN network element 110. Similar to FIGS. 3-4, the OTN network element 110 in FIG. 5 includes the OTUk adaptation functions 210 and the ODUk monitor point 220. The ODUk monitor point 220 is configured to look for defects in the OTN signal such as, for example, AIS, Open Channel Indicator (OCI), Locked (LCK), etc. These defects may be inserted at the OTN network element 510.

Figure 6:
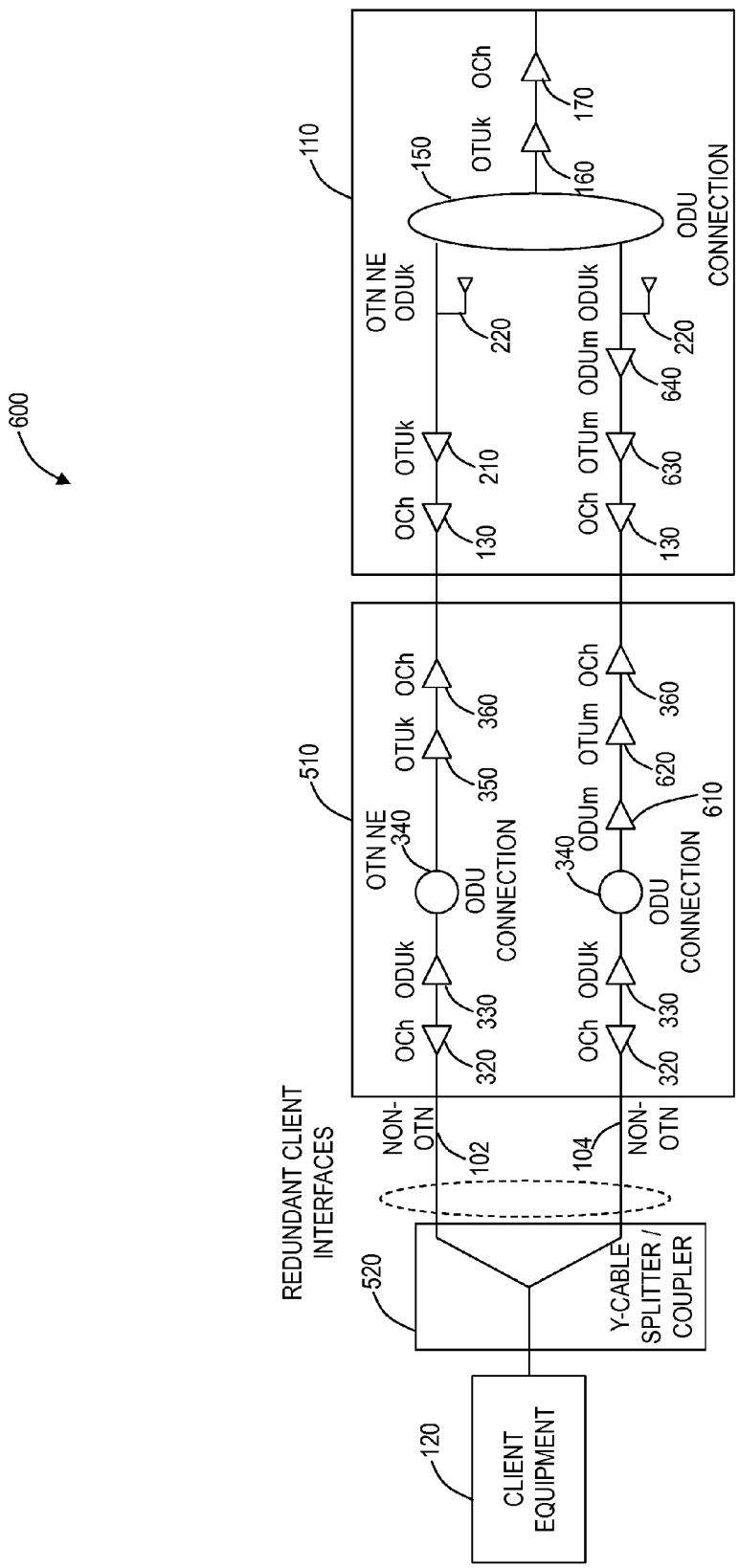
FIG. 6 is a block diagram of Y-Cable protection on remote network element client interfaces carried on different OTUk line rates to an OTN switching network element.

Referring to FIG. 6, in an exemplary embodiment, a block diagram illustrates a sixth configuration 600 with Y-Cable protection on remote network element client interfaces 102, 104 carried on different OTUk line rates to an OTN switching network element 110. The configuration 600 includes the same functions 130, 132, 142, 150, 160, 170, 210, 320, 330, 340, 350, 360 and monitor point 220 as the configurations 100, 200, 300, 400, 500. The configuration includes non-OTN clients for the client interfaces 102, 104 and a single OTN network element 510 providing the client interfaces 102, 104 into an OTN interface for the OTN network element 110. In an exemplary embodiment, the OTN network element 110 is a switching network element, such as an optical switch, and the OTN network element 510 is a transponder network element, such as a DWDM network element. In FIG. 5, the configuration 500 includes equivalent redundant lines through the OTN network element 510. FIG. 6 shows the configuration 600 where the redundant lines are not equivalent on all spans, i.e. the client interface 104 is multiplexed. For example, the client interface 102 can be provided into an ODU2 (e.g., the client interface 102 is a 10G signal) and the client interface 104 can be the same 10G signal provided into an ODU3.

The configuration 600 includes the Y-cable device 520 operating similarly as shown in FIG. 5. Also, the client interface 102 operates similarly through the OTN network elements 110, 510 as shown in FIG. 5. The client interface 104, on the other hand, is provided to the ODUk function 330 and the ODU connection function 340. Here, the same operations are provided as described herein, i.e. defect insertion. The adaptation function 330 is configured to utilize maintenance signaling within the OTN protocol to provide a generic mechanism to indicate client faults for both the client interfaces 102, 104. Subsequent to the ODU connection function 340, the client interface 104 is multiplexed via an ODUm multiplexing function 610 and an OTUm multiplexing function 620. The OCh function 360 for the client interface 104 connects to the OCh function 130 on the OTN network element 110. The OTN network element 110 includes an OTUm multiplexing function 630 and an ODUm multiplexing function 640 into the ODUk monitor point 220.

The multiplexing functions 610, 620, 630, 640 provide multiplexing/demultiplexing of the client interface 104 into a higher level OTU signal. For example, the assume the client interfaces 102, 104 are 10 Gigabit Ethernet (or some other variation of a 10G signal). The client interface 102 can be provided directly into an OTU2. Here, the OCh functions 360, 130 interface at 10G. The client interface 104 can be multiplexed into an ODU3 for transport at 40G or an ODU4 for transport at 100G with other signals included therewith. The defect insertion functionality via the ODUk function 330, the monitoring functionality via the ODUk monitor point 220, and the switching functionality via the ODU connection function 150 are not affected by the multiplexing.

Figure 7:
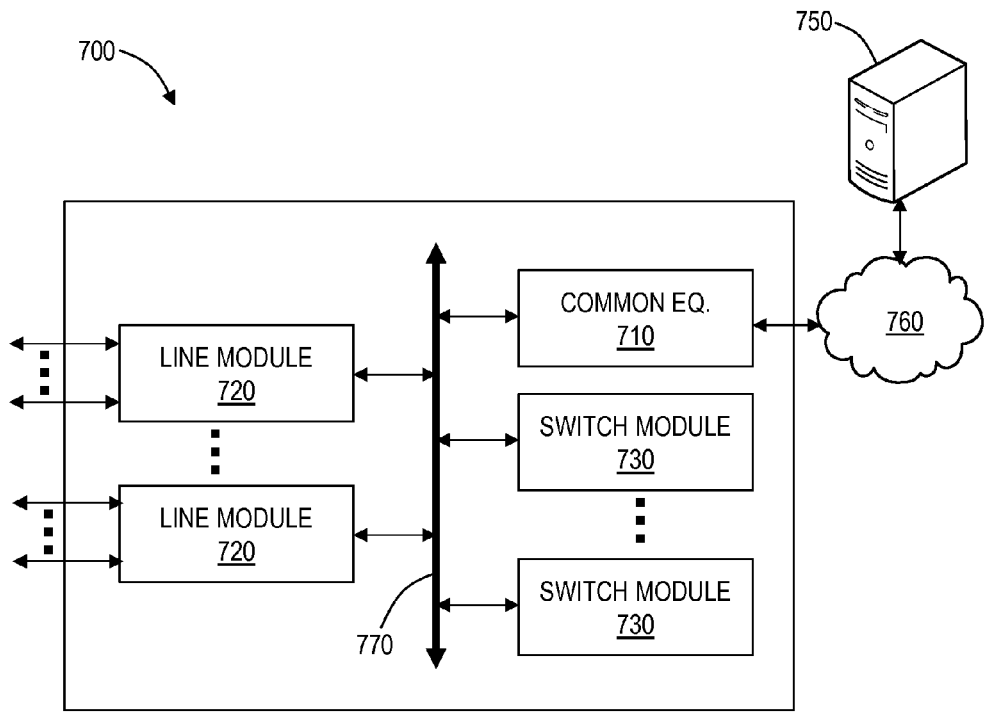
FIG. 7 is a block diagram of an exemplary OTN network element.

Referring to FIG. 7, in an exemplary embodiment, a block diagram illustrates an exemplary node 700 for the OTN systems and methods. In an exemplary embodiment, the exemplary node 700 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and 2 consolidation. In another exemplary embodiment, the node 700 can be any of an OTN add/drop multiplexer (ADM), a SONET/SDH ADM, a multi-service provisioning platform (MSPP), a digital cross-connect (DCS), an optical cross-connect, an optical switch, a router, a switch, a WDM terminal, an access/aggregation device, etc. That is, the node 700 can be any digital system with ingress and egress digital signals and switching therebetween of channels, timeslots, tributary units, etc. utilizing OTN. While the node 700 is generally shown as an optical network element, the OTN systems and methods are contemplated for use with any switching fabric, network element, or network based thereon.

In an exemplary embodiment, the node 700 includes common equipment 710, one or more line modules 720, and one or more switch modules 730. The common equipment 710 can include power; a control module; operations, administration, maintenance, and provisioning (OAM&P) access; user interface ports; and the like. The common equipment 710 can connect to a management system 750 through a data communication network 760. The management system 750 can include a network management system (NMS), element management system (EMS), or the like. Additionally, the common equipment 710 can include a control plane processor configured to operate a control plane as described herein. The node 700 can include an interface 770 for communicatively coupling the common equipment 410, the line modules 420, and the switch modules 730 therebetween. For example, the interface 770 can be a backplane, mid-plane, a bus, optical or electrical connectors, or the like. The line modules 720 are configured to provide ingress and egress to the switch modules 730 and external to the node 700. In an exemplary embodiment, the line modules 420 can form ingress and egress switches with the switch modules 730 as center stage switches for a three-stage switch, e.g. a three stage Clos switch. Other configurations and/or architectures are also contemplated. The line modules 720 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10GbE PHY), 40 Gb/s (OC-768/STM-256, OTU3, ODU3, 40GbE PHY), 100 Gb/s (OTU4, ODU4, 100GbE PHY), etc.

Further, the line modules 720 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, and any rate in between. The line modules 420 can include wavelength division multiplexing interfaces, short reach interfaces, and the like, and can connect to other line modules 720 on remote network elements, end clients, edge routers, and the like. From a logical perspective, the line modules 720 provide ingress and egress ports to the node 700, and each line module 720 can include one or more physical ports. The switch modules 730 are configured to switch channels, timeslots, tributary units, etc. between the line modules 720. For example, the switch modules 730 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 730 can include both Time Division Multiplexed (TDM) (i.e., circuit switching) and packet switching engines. The switch modules 730 can include redundancy as well, such as 1:1, 1:N, etc. In an exemplary embodiment, the switch modules 730 provide OTN switching.

Those of ordinary skill in the art will recognize the node 700 can include other components which are omitted for illustration purposes, and that the systems and methods described herein are contemplated for use with a plurality of different network elements with the node 700 presented as an exemplary type of network element. For example, in another exemplary embodiment, the node 700 may not include the switch modules 730, but rather have the corresponding functionality in the line modules 720 (or some equivalent) in a distributed fashion. For the node 700, other architectures providing ingress, egress, and switching therebetween are also contemplated for the systems and methods described herein. In general, the systems and methods described herein contemplate use with any network element providing switching of OTN channels, timeslots, tributary units, etc. In various exemplary embodiments, the node 110A is configured to support the systems and methods described herein through configuration of the modules 710, 720, 730. In an exemplary embodiment, the OCh functions 120, 170, 320, 360 can be implemented by the line modules 720 through ports disposed therein. The other functions described herein can be implemented by the common equipment 710, the line modules 720, and/or the switch modules 730 individually or in combination.

Figure 8:
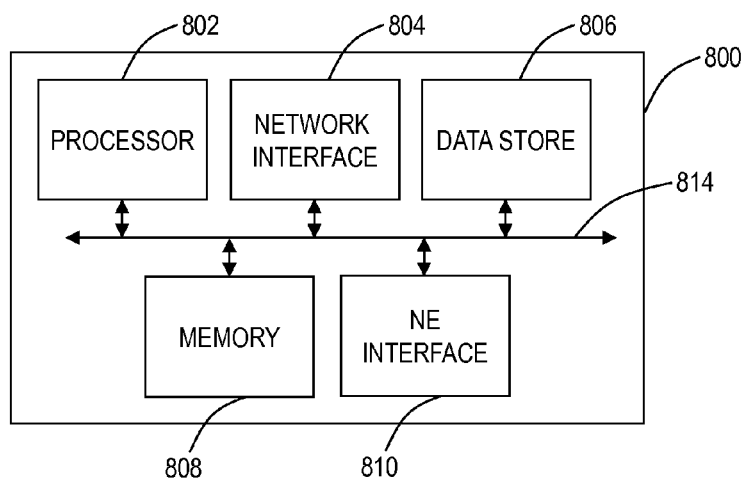
FIG. 8 is a block diagram of a control module to provide control plane processing and/or OAM&P for an OTN network element such as the OTN network element of FIG. 7.

Referring to FIG. 8, in an exemplary embodiment, a block diagram illustrates a control module 800 to provide control plane processing and/or OAM&P for a node such as the node 700. The control module 800 can be part of common equipment, such as common equipment 710 in the node 700. The control module 800 can include a processor 802 which is hardware device for executing software instructions such as operating the control plane. The processor 802 can be any custom made or commercially available processor, a central processing unit (CPU), an auxiliary processor among several processors associated with the control module 800, a semiconductor-based microprocessor (in the form of a microchip or chip set), or generally any device for executing software instructions. When the control module 800 is in operation, the processor 802 is configured to execute software stored within memory, to communicate data to and from the memory, and to generally control operations of the control module 800 pursuant to the software instructions. The control module 800 can also include a network interface 804, a data store 806, memory 808, a network element interface 810, and the like, all of which are communicatively coupled therebetween and with the processor 802.

The network interface 804 can be used to enable the control module 800 to communicate on a network, such as to communicate control plane information to other control modules, to the management system 760, and the like. The network interface 804 can include, for example, an Ethernet card (e.g., 10BaseT, Fast Ethernet, Gigabit Ethernet) or a wireless local area network (WLAN) card (e.g., 802.11a/b/g). The network interface 804 can include address, control, and/or data connections to enable appropriate communications on the network. The data store 806 can be used to store data, such as control plane information, provisioning data, OAM&P data, etc. The data store 806 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 806 can incorporate electronic, magnetic, optical, and/or other types of storage media. The memory 808 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 808 may incorporate electronic, magnetic, optical, and/or other types of storage media. Note that the memory 808 can have a distributed architecture, where various components are situated remotely from one another, but may be accessed by the processor 802.

The network element interface 810 includes components for the control module 800 to communicate to other devices in a node, such as through the local interface 770. The components (802, 804, 806, 808, 810) are communicatively coupled via a local interface 914. The local interface 814 and the network element interface 810 can be, for example but not limited to, one or more buses or other wired or wireless connections, as is known in the art. The local interface 814 and the network element interface 810 can have additional elements, which are omitted for simplicity, such as controllers, buffers (caches), drivers, repeaters, and receivers, among many others, to enable communications. Further, the local interface 814 and the network element interface 810 can include address, control, and/or data connections to enable appropriate communications among the aforementioned components.

In conjunction with the node 700 and the control module 800, it will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. An Optical Transport Network (OTN) node, comprising:
   redundant client interfaces comprising a first port and a second port; and
   a controller communicatively coupled to the first port and the second port, wherein the controller is configured to utilize maintenance signaling within the OTN protocol providing a mechanism to indicate client faults with one or more associated devices connected to the first port and the second port, wherein the client faults are processed at an OTN path layer instead of a client protocol layer;
   wherein the mechanism comprises a uni-directional protection scheme for the redundant client interfaces in the OTN protocol with the OTN path layer selecting paths based on the maintenance signaling independent of any client protocol of the one or more associated devices.

2. The OTN node of claim 1, wherein the maintenance signaling is at an Optical channel Data Unit (ODU) path layer.

3. The OTN node of claim 2, wherein the maintenance signaling comprises one of an Alarm Indication Signal (AIS) in an Optical channel Payload Unit (OPU) payload and assertion of an OPU Client Signal Fail (CSF) each of which is transparent to ODU layer processing.

4. The OTN node of claim 1, further comprising:
   a Y-cable splitter/coupler connecting each of the first port and the second port to the one or more associated devices.

5. The OTN node of claim 1, further comprising:
   a first Optical Channel (OCh) function on the first port communicatively coupled to the one or more associated devices; and
   a second Optical Channel (OCh) function on the second port communicatively coupled to the one or more associated devices.

6. The OTN node of claim 5, wherein the first OCh function and the second OCh function each interface to the one or more associated devices with non-OTN signals, and the OTN node further comprises:
   a first Optical channel Data Unit (ODUk) function communicatively coupled to the first OCh function;
   a second ODUk function communicatively coupled to the second OCh function, wherein each of the first ODUk function and the second ODUk function is configured to adapt the non-OTN signals into an OTN signal and to utilize the maintenance signaling to indicate client faults; and
   an ODU connection function communicatively coupled to each of the first ODUk function and the second ODUk function and configured to select one of the redundant client interfaces based on the maintenance signaling.

7. The OTN node of claim 5, wherein the first OCh function interfaces with an OTN signal and the second OCh function interfaces with a non-OTN signal, and the OTN node further comprises:
   a first Optical channel Transport Unit (OTUk) function communicatively coupled to the first OCh function and an ODUk monitor point communicatively coupled to the OTUk function and configured to monitor for the maintenance signaling in the OTN signal;
   a second ODUk function communicatively coupled to the second OCh function, wherein the second ODUk function is configured to adapt the non-OTN signal into an OTN signal and to utilize the maintenance signaling to indicate client faults; and
   an ODU connection function communicatively coupled to each of the ODUk monitor point and the second ODUk function and configured to select one of the redundant client interfaces based on the maintenance signaling.

8. The OTN node of claim 7, wherein the first OCh function is communicatively coupled to an OTN transponder network element, and wherein the OTN transponder network element comprises a first ODUk function configured to adapt a non-OTN signal into the OTN signal and to utilize the maintenance signaling to indicate client faults.

9. The OTN node of claim 5, wherein the first OCh function is communicatively coupled to a first OTN transponder network element, and wherein the first OTN transponder network element comprises a first ODUk function configured to adapt a non-OTN signal into the OTN signal and to utilize the maintenance signaling to indicate client faults;
   wherein the second OCh function is communicatively coupled to a second OTN transponder network element, and wherein the second OTN transponder network element comprises a second ODUk function configured to adapt a non-OTN signal into the OTN signal and to utilize the maintenance signaling to indicate client faults; and
   wherein the OTN node further comprises:
      a first Optical channel Transport Unit (OTUk) function communicatively coupled to the first OCh function and a first ODUk monitor point communicatively coupled to the first OTUk function and configured to monitor for the maintenance signaling in the OTN signal;
      a second Optical channel Transport Unit (OTUk) function communicatively coupled to the second OCh function and a second ODUk monitor point communicatively coupled to the second OTUk function and configured to monitor for the maintenance signaling in the OTN signal; and
      an ODU connection function communicatively coupled to each of the first ODUk monitor point and the second ODUk monitor point and configured to select one of the redundant client interfaces based on the maintenance signaling.

10. The OTN node of claim 5, wherein the first OCh function and the second OCh function each interface to a Y-cable splitter/coupler, wherein the Y-cable splitter/coupler is configured to split a single interface from the one or more associated devices to become the redundant client interfaces and to select one output from the OTN node to the one or more associated devices.

11. The OTN node of claim 5, wherein the OTN node comprises OTN multiplexing on at least one of outputs of the first OCh function and the second OCh function.

12. The OTN node of claim 1, wherein the maintenance signaling is transparent to Optical channel Data Unit (ODU) processing.

13. An Optical Transport Network (OTN) switching device, comprising:
- switching circuitry configured to receive a first Optical channel Data Unit k (ODUk) and a second ODUk, wherein the first ODUk and the second ODUk each originate from redundant client interfaces, and wherein the circuitry is configured to select one of the first ODUk and the second ODUk based upon maintenance signaling providing a mechanism to indicate client faults associated with the redundant client interfaces, wherein the client faults are processed at an OTN path layer instead of a client protocol layer; and
- Optical channel Transport Unit k (OTUk) circuitry configured to adapt an output from the switching circuitry into an OTUk;
- wherein the mechanism comprises a uni-directional protection scheme for the redundant client interfaces in OTN with the OTN path layer selecting paths based on the maintenance signaling independent of any client protocol associated with the redundant client interfaces.

14. The OTN switching device of claim 13, wherein the maintenance signaling is at an Optical channel Data Unit (ODU) path layer.

15. The OTN switching device of claim 14, wherein the maintenance signaling comprises one of an Alarm Indication Signal (AIS) in an Optical channel Payload Unit (OPU) payload and assertion of an OPU Client Signal Fail (CSF) each of which is transparent to ODU layer processing.

16. The OTN switching device of claim 13, further comprising:
- first ODUk circuitry configured to provide the first ODUk to the switching circuitry; and
- second ODUk circuitry configured to provide the second ODUk to the switching circuitry;
- wherein each of the first ODUk circuitry and the second ODUk circuitry is configured to adapt non-OTN signals into an OTN signal and to utilize the maintenance signaling to indicate client faults detected therein.

17. The OTN switching device of claim 16, further comprising:
- ODUk multiplexing circuitry separate from the first ODUk circuitry, wherein the ODUk multiplexing circuitry is configured to provide the first ODUk to the switching circuitry.

18. An Optical Transport Network (OTN) method, comprising:
- receiving signals via redundant client interfaces from a client device;
- detecting a fault on one of the redundant client interfaces;
- processing the fault at an OTN path layer via a protection mechanism instead of at a client protocol layer via utilizing maintenance signaling; and
- providing switching at an Optical channel Data Unit k (ODUk) layer based on the maintenance signaling;
- wherein the protection mechanism comprises a uni-directional protection scheme for the redundant client interfaces in OTN with the OTN path layer selecting paths based on the maintenance signaling independent of any client protocol associated with the redundant client interfaces.

* * * * *